United States Patent
Van Phan et al.

(10) Patent No.: US 9,973,992 B2
(45) Date of Patent: May 15, 2018

(54) OFFLOADING OF USER PLANE PACKETS FROM A MACRO BASE STATION TO AN ACCESS POINT

(75) Inventors: Vinh Van Phan, Oulu (FI); Ling Yu, Oulu (FI); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 103 days.

(21) Appl. No.: 14/407,130

(22) PCT Filed: Jun. 29, 2012

(86) PCT No.: PCT/EP2012/062662
§ 371 (c)(1),
(2), (4) Date: Dec. 11, 2014

(87) PCT Pub. No.: WO2014/000808
PCT Pub. Date: Jan. 3, 2014

(65) Prior Publication Data
US 2015/0181491 A1    Jun. 25, 2015

(51) Int. Cl.
*H04W 4/00* (2018.01)
*H04W 36/22* (2009.01)
(Continued)

(52) U.S. Cl.
CPC .......... *H04W 36/22* (2013.01); *H04W 28/08* (2013.01); *H04W 36/0066* (2013.01);
(Continued)

(58) Field of Classification Search
CPC ............. H04W 36/00; H04W 36/0005; H04W 36/0016; H04B 7/18541; H04L 47/767
See application file for complete search history.

(56) References Cited

U.S. PATENT DOCUMENTS 9,148,776 B1 * 9/2015 Schroeder ............. H04W 8/087
2010/0128664 A1 * 5/2010 Denny .............. H04W 36/0033
370/328
(Continued)

FOREIGN PATENT DOCUMENTS

WO   WO 2012/038911 A    3/2012
WO   WO 2012/142436 A1   10/2012

OTHER PUBLICATIONS

NTT Docomo Confidential: "Macro-assisted Enhanced Local Area Cell—Split of C-plane and U-plane—NTT Docomo, Inc." NSN-Docomo Bilateral Meeting, Feb. 29, 2012, pp. 1-24.
(Continued)

*Primary Examiner* — Chi H Pham
*Assistant Examiner* — Fahmida Chowdhury
(74) *Attorney, Agent, or Firm* — Harrington & Smith (57) ABSTRACT

A method for radio access offloading is disclosed, wherein the method includes maintaining, in a user terminal pre-configuration information on integrated local area radio access offloading layers. In response to detecting an access point of an available offloading layer, the user terminal may activate a local area radio access offloading mode. The user terminal transmits, to the base station via the access point, an indication indicating that the offloading mode is activated, and receives, from the base station, a confirmation indicating that the activated offloading mode is accepted by the base station. The user terminal then decides, whether or not to switch to the available offloading layer, wherein if the user terminal decides to switch to the available offloading layer, offloading is performed via the access point.

46 Claims, 4 Drawing Sheets

(51) Int. Cl.
*H04W 28/08* (2009.01)
*H04W 36/00* (2009.01)
*H04W 36/26* (2009.01)
*H04W 48/16* (2009.01)
*H04W 72/04* (2009.01)
*H04W 48/18* (2009.01)
*H04W 88/06* (2009.01)

(52) U.S. Cl.
CPC ........... *H04W 36/26* (2013.01); *H04W 48/16* (2013.01); *H04W 72/042* (2013.01); *H04W 48/18* (2013.01); *H04W 88/06* (2013.01)

(56) References Cited

U.S. PATENT DOCUMENTS

| | | | | |
|---|---|---|---|---|
| 2011/0222523 A1* | 9/2011 | Fu | .................. | H04W 36/22 370/338 |
| 2011/0267948 A1* | 11/2011 | Koc | .................. | H04L 5/003 370/235 |
| 2011/0286437 A1* | 11/2011 | Austin | .................. | H04W 4/02 370/338 |
| 2011/0287794 A1 | 11/2011 | Koskela et al. | ............... | 455/509 |
| 2012/0015607 A1 | 1/2012 | Koskela et al. | ............... | 455/62 |
| 2012/0023189 A1 | 1/2012 | Giaretta et al. | ............... | 709/217 |
| 2012/0135719 A1 | 5/2012 | Haughn | ............... | 455/414.1 |
| 2012/0230191 A1* | 9/2012 | Fang | ............... | H04W 36/22 370/235 |
| 2013/0083661 A1* | 4/2013 | Gupta | ............... | H04W 28/0215 370/235 |
| 2013/0102313 A1* | 4/2013 | Tinnakornsrisuphap | | H04W 36/22 455/436 |
| 2013/0279489 A1* | 10/2013 | Calcev | ............... | H04W 28/10 370/338 |
| 2014/0003239 A1* | 1/2014 | Etemad | ............... | H04W 28/08 370/235 |
| 2015/0304913 A1* | 10/2015 | Uusitalo | ............... | H04W 36/02 455/444 |

OTHER PUBLICATIONS

Nokia Siemens Networks et al: "LTE-WiFi Dynamic Flow Switching—Observatons from Brainstorming" pp. 1-30; https://domino2.extranet.nokiasiemensnetworks.com/Networks/3grplus.nsf/0/5171FB5C40CO3AACC22579680031B222.

3GPP TSG-RAN WGI #68, Dresden, Germany, Feb. 6-10, 2012, R1-120641, "Discussion on further enhancements to LTE TDD for dynamic TDD UL-DL configuration", CNCC, 5 pgs.

3GPP TSG RAN WG2 #75bis, Zhuhai, China, Oct. 10-14, 2011, R2-115047, "Small Cell Discovery for Traffic Offloading", Vodafone, 3 pgs.

3GPP TSG-RAN WG2 Meeting #78, Prague, Czech Republic, May 21-25, 2012, R2-122366, "Background search for small cell detection", Nokia Siemens Networks, Nokia Corporation, 11 pgs.

* cited by examiner

OFFLOADING OF USER PLANE PACKETS FROM A MACRO BASE STATION TO AN ACCESS POINT

FIELD OF THE INVENTION

The exemplary and non-limiting embodiments of this invention relate generally to wireless communications networks, and more particularly to radio access offloading.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Adding capacity with Wi-Fi saves mobile network expansion costs if some of the data traffic is offloaded to Wi-Fi. Mobile data offloading solutions make offloading from the mobile network to Wi-Fi seamless both for the subscriber and the mobile network core. Wi-Fi's massive worldwide footprint makes it the offloading technology of choice for network carriers, and network operators may encourage their customers to ease network congestion by voluntarily using Wi-Fi when it is available. Both subscribers and devices tend to try to connect to Wi-Fi whenever it is in reach, and some applications are only available in Wi-Fi mode. Mobile operators need to follow their subscribers into the Wi-Fi environment.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, apparatuses, computer program product, and a computer-readable storage medium as defined in the independent claims. Further embodiments of the invention are disclosed in the dependent claims.

An aspect of the invention relates to a method for radio access offloading in a communications system, the method comprising maintaining, in a terminal apparatus served by a base station, pre-configuration information on at least one integrated local area radio access offloading layer, detecting, in the terminal apparatus, an access point of an available integrated local area radio access offloading layer; in response to the detecting, activating, in the terminal apparatus, a local area radio access offloading mode; transmitting, from the terminal apparatus to the base station, an initial indication indicating that the local area radio access offloading mode is activated in the terminal apparatus; receiving, in the terminal apparatus from the base station, a confirmation indicating that the activated local area radio access offloading mode is accepted by the base station; deciding, in the terminal apparatus, whether or not to switch to the available integrated local area radio access offloading layer, wherein if it is decided, in the terminal apparatus, to switch to the available integrated local area radio access offloading layer, the method comprises performing offloading operation of a user plane packet via the access point.

A further aspect of the invention relates to an apparatus comprising at least one processor, and at least one memory including a computer program code, wherein the at least one memory and the computer program code are configured to, with the at least one processor, cause the apparatus to maintain pre-configuration information on at least one integrated local area radio access offloading layer; detect an access point of an available integrated local area radio access offloading layer; in response to the detecting, activate a local area radio access offloading mode; transmit, to a serving base station via the access point, an initial indication indicating that the local area radio access offloading mode is activated in the apparatus; receive, from the base station, a confirmation indicating that the activated local area radio access offloading mode is accepted by the base station; decide whether or not to switch to the available integrated local area radio access offloading layer, wherein if it is decided, in the apparatus, to switch to the available integrated local area radio access offloading layer, the at least one memory and the computer program code are configured to, with the at least one processor, cause the apparatus to perform offloading operation of a user plane packet via the access point.

A still further aspect of the invention relates to a base station comprising at least one processor, and at least one memory including a computer program code, wherein the at least one memory and the computer program code are configured to, with the at least one processor, cause the base station to receive, from a terminal apparatus via an access point of an available integrated local area radio access offloading layer, an initial indication indicating that a local area radio access offloading mode is activated in the terminal apparatus; transmit, to the terminal apparatus, a confirmation indicating that the activated local area radio access offloading mode is accepted by the base station.

A still further aspect of the invention relates to a computer program comprising program code means adapted to perform any of the method steps when the program is run on a computer.

A still further aspect of the invention relates to a computer-readable medium having stored thereon a data structure, comprising a computer readable medium and embodying program instructions thereon executable by a computer operably coupled to a memory which, when executed by the computer, carry out the functions according to the method.

BRIEF DESCRIPTION OF THE DRAWINGS

In the following the invention will be described in greater detail by means of exemplary embodiments with reference to the attached drawings, in which.

DETAILED DESCRIPTION OF SOME EMBODIMENTS

A wireless carrier-class Wi-Fi system, including indoor and outdoor access points, gateways and/or controllers, allows operators to transparently accommodate mobile subscriber devices using trusted Wi-Fi access without requiring any client software. It integrates Wi-Fi traffic into operator packet core networks through standard industry interfaces, providing a variety of offloading options. It also integrates Wi-Fi with mobile broadband networks, and may embrace Wi-Fi in additional ways, such as integrating Wi-Fi from several partners through its WLAN connectivity solution, and providing small cell concepts, including a built-in Wi-Fi access.

Operators are looking for new solutions that combine carrier-class Wi-Fi with small cell technology that complement their macro environments and may be seamlessly integrated within their existing and future core infrastructures.

Thus an exemplary embodiment provides a simple and effective solution with LTE/LTE-A network assisted semi-autonomous WiFi offloading for supporting 1) high user density local area deployment scenarios which are calling for possible alternative RATs in a true HetNet environment, and 2) CAPEX-OPEX and capacity improvements with WiFi offloading.

Small cell deployments may occur in 3.5 GHz and up to 60 GHz due to a poor link budget. In a conventional pico/femto cell, connectivity/mobility/coverage performance may be degraded in higher frequency bands (e.g. 3.5 GHz-60 GHz). Hot spot deployments are expected, instead of wide area coverage in conventional cellular network. High inter-working between conventional macro cell (low frequency) and small cell (high frequency) is required.

Therefore basic coverage/mobility is supported in lower frequency bands, e.g. existing cellular bands. Current service quality in terms of connectivity/mobility can be maintained, and control signalling for efficient small-cell discovery can be supported. Thus poor link budget in higher frequency bands is not an issue anymore. High speed data transmission is supported in higher frequency bands (large bandwidth, mainly for smaller or denser cell deployments). A low cost network can be provided where the small cell cost is comparable to a WiFi access point.

A macro base station may establish/re-configure/release a connection between an enhanced local area cell (eLA cell) and a user equipment (C-plane). The eLA cell may communicate with the user equipment for offload purpose (U-plane), while a conventional macro-base-station-to-user-equipment link should be maintained. Thus the eLA cell is a candidate for higher frequency band deployment.

CA enhancements (eCA) may be needed. One option is RRH-based eCA. Macro-assisted RRH-based eCA and the macro-assisted eLA cell (i.e. the cellular network (macro cell) assists local area network access) enable QoS handling, load balancing, simple cell planning, energy saving, and interference coordination.

The macro base station may flexibly select a link suitable for each data bearer. A high QoS data bearer, such as voice service, operator-specific service and high-security data may be transferred in a conventional LTE link. Other data bearers, such as best effort/delay tolerant data may be transferred in an eLA-to-UE link.

Several terminals may try to connect to a WiFi access point simultaneously. The access point may be broken down or it may provide poor performance due to congestion. The eLA cell offload may handle the load balancing in a more advanced manner, because the macro cell is able to control the connections. The eLA cell size may be adjusted flexibly. Each L1/L2 configuration may be dynamically configured by the macro cell. Discovery signals potentially orthogonal among the eLA cells effectively provide good cell identification functionality irrespective of eLA cell size and density. Energy may be saved since in case there is little traffic, the eLA cell does not transmit any signal except for discovery signals. The macro cell may be on service all the time and is able to handle such small traffic. Once traffic load increases, the eLA cell starts operating. In a local area with fractional traffic among cells, spectrum sharing gives significant gain in spectrum efficiency. Spectrum is shared between DL and UL (dynamic TDD). The macro cell may handle more advanced interference coordination. Each L1/L2 configuration may be dynamically configured by the macro cell. There are no common signals in the eLA-to-UE link. 3GPP standards have specified supports for 3GPP and non-3GPP interworking including ANDSF assisted network controlled WiFi offloading. Solutions for LTE-WiFi integration are disclosed.

An exemplary embodiment relates to LTE/LTE-A network assisted semi-autonomous WiFi offloading. An exemplary embodiment is targeted for 3GPP LTE-A Rel-12/13, addressing possible use of integrated WiFi for local-area radio-access level offloading.

In an exemplary embodiment, WiFi APs may be deployed underneath the macro cell coverage and connected to, coordinated and controlled by the serving macro eNB and cellular network, forming some integrated radio access layer of the serving macro cell for U-plane. This may be referred to as an integrated radio access offloading layer. C-plane may be provided by the serving macro eNB. An LTE-A bearer service model may be kept, but actual data transmissions of U-plane RB may be transferred via WiFi. This means that possible offloading may be kept at the radio access layer and each EPC bearer of UE is still terminated at a serving eNB. It may be configurable whether only best effort traffic and RB thereof or any of U-plane traffic and RB thereof may be offloaded. The transmission of individual RB is not split but switched in time between LTE and WiFi for possible offloading. U-plane cellular security may be applied, meaning that service data units sent/offloaded over WiFi are at least after LTE PDCP processing. Further LTE L2 data processing including packet segmentation or concatenation is not assumed when offloading over WiFi for simplicity reason.

An exemplary embodiment proposes a method to facilitate the above system scenario in which UE is allowed to make offloading decisions by itself as much as possible and to send an initial indication to the serving eNB over a selected AP of the offloading layer, so as to minimize control overhead for a serving cellular network. This method may therefore be referred to as network assisted semi-autonomous WiFi offloading which may also be considered as a new mode of operation for UE to access the network.

In an exemplary embodiment, for supporting self-activation of the operation mode behind the proposed semi-autonomous WiFi offloading, there may be following alternatives:

Pre-configuration with network-assisted discovery. Information about possible integrated radio access offloading layers (e.g. some specific identifiers and attributes in names or types of authentic APs) may be preconfigured to UEs so that UEs, upon discovering AP which has the corresponding attributes matching the pre-configured information, may activate the corresponding operation mode. For some network assisted discovery, either ANDSF or eNB may be configured to inform UEs of the available integrated radio access offloading layer. For example, APs of the available integrated radio access offloading layer are configured with identifiers and attributes which have some particular part specific to an operator, service area, or serving cell. UEs are pre-configured or informed of that with either dedicated or common signalling of the network. The serving eNB may further inform UEs about the existence of the offloading layer, or that the serving eNB is supporting the offloading mode of interest under its coverage, by using e.g. one or more bits indication sent in either a broadcast control channel or PDCCH. UE may reactivate relevant radio and perform actual detection of the offloading layer or deactivate that according to whether the indication is received from the serving eNB or not. This is considered as a prior phase of the offloading mode self-activation process. In this regard, this one or more bits indication may also be used for access control of the offloading mode as well. For instance, the serving eNB may stop sending this indication if the number of active UEs which are having the offloading mode activated and used exceeds a certain load threshold. Then new active UEs after that do not activate and use the offloading mode. This alternative may be applied for UE either in an idle or active state.

Dynamic configuration. The serving eNB may send an explicit control message to activate (reactivate or deactivate) the operation mode as a part of some new E-UTRAN signalling procedure designated to support such an operation mode. The message also specifies the available integrated radio access offloading layer underneath. This alternative is mainly for active UEs (broadcast common control information may be used to support also idle UEs, as in the first alternative above) and, perhaps, covered by prior arts.

An active UE may need to initially indicate about having the offloading operation mode activated to the serving eNB. Conventionally, new explicit LTE control signalling procedure between UE and serving eNB is proposed for that purpose. An exemplary embodiment proposes following options:

UE sends the initial indication of having the offloading operation mode activated with a blank packet or C-RNTI as the payload or in a form of a new PDCP C-PDU (which may not be specific to any U-plane radio bearer at this stage) via a selected WiFi AP. The transport server at the serving eNB is supposed to catch the message and inform the serving eNB of the received message :device address, C-RNTI or PDCP C-PDU. The serving eNB may then acknowledge or confirm UE via C-plane cellular access signalling, and, optionally, also acknowledge via WiFi AP in addition (sending some identifier of the serving cell for example). This allows for the offloading access to be initially tested.

Implicit or embedded LTE control signalling may be used for initial indication/acknowledgement of having the offloading operation mode activated as well, e.g. via RRC UE capability indication, RRC measurement reporting, either with a blank message or with a new information element.

In an exemplary embodiment, for controlling the operation mode of the proposed semi-autonomous WiFi offloading, especially UE initiated fast switching between the regular LTE-A access and offloading WiFi access thereof, following is proposed (UE is assumed to be in an active state and have the aforementioned operation mode activated):

UE is configured with regular RB(s) for U-plane traffic even when actual U-plane data is transferred over WiFi.

The monitor-able constraints of the configured RB(s) and "delta" parameters thereof are used as criteria for UE to decide whether to switch to WiFi layer or not, back and forth. These may include e.g. performance or QoS parameters (required bit rate or throughput, delay or delay variation, power budget, traffic or RAT based priority, DRX parameters, etc.)

UE is allowed to make switching decision by itself, at least to initiate switching procedure to the serving eNB including possible request/indication and response/confirmation, either explicit or implicit. The explicit option which means new E-UTRAN procedures seems quite straightforward and perhaps part of prior arts. UE may also send the offloading request/indication in form of a blank U-plane packet with/without C-RNTI attached or a new PDCP C-PDU via a selected AP and the serving eNB may acknowledge that via C-plane, as proposed for the initial indication of the mode activation above. For the implicit option, UE may send a blank measurement report to eNB to request/indicate a switching to WiFi, or UE may send a blank buffer status report or scheduling request to eNB for switching back to LTE-A. In another option, UE may not need to indicate to the serving eNB beforehand for switching to WiFi in uplink direction, as the network side may catch the packets of UE and determine to act on that.

The network side may initiate and control the offloading and switching as well, using similar explicit/implicit signalling. The implicit signalling option may be based on e.g. issuing a blank measurement request or a blank handover command to initiate WiFi offloading, or via resource allocation with at least a preconfigured "delta" increase compared to the previous one or, again, a blank handover command to allow UE to switch back to LTE-A.

For ensuring in-order delivery and loss recovery, PDCP level content synchronization or acknowledgement procedures may be introduced for the aforementioned offloading operation mode, either periodical or even triggered with certain timer based or packet sequence number based window operation. This may be implemented using new PDCP C-PDU or RRC signalling or a combination thereof, at least UE may be allowed to send PDCP C-PDU in the uplink over a selected AP.

Due to a connection-less nature of AP and if mapping between device address used in WiFi and the cellular C-RNTI at the serving eNB is not available then C-RNTI may be attached to each U-plane SDU sent over WiFi.

Furthermore, in case more than one RBs of UE are being offloaded, then some LCID needs to be attached to the service data units sent over WiFi as well.

It should be noted that an exemplary embodiment may be applied for similar system scenarios in which the U-plane offloading radio access layer is based on other RAT than WiFi as well. For examples, systems with a LTE based offloading layer may also use the exemplary method as well. In this case, further implementation alternatives for sending UE initial indications related to the offloading mode via a selected AP may consider using MAC control PDUs, in addition to or instead of PDCP control PDUs.

Exemplary embodiments will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, network node, server, corresponding component, and/or to any communication system or any combination of different communication systems that support radio access offloading. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, an architecture based on LTE (long term evolution) network elements, without restricting the embodiment to such an architecture, however. The embodiments described in these examples are not limited to the LTE radio systems but can also be implemented in other radio systems, such as UMTS (universal mobile telecommunications system), LTE-A, GSM, EDGE, WCDMA, bluetooth network, WLAN or other fixed, mobile or wireless network. In an embodiment, the presented solution may be applied between elements belonging to different but compatible systems such as LTE and UMTS.

Figure 1:
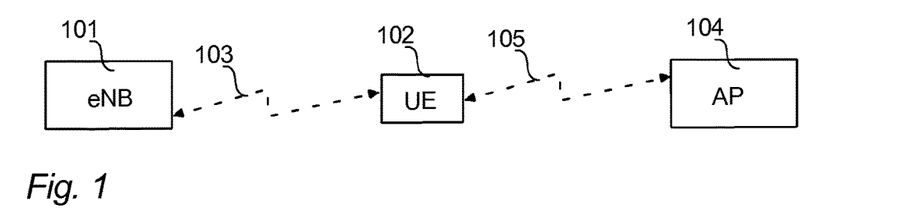
FIG. 1 shows a simplified block diagram illustrating exemplary system architecture.

A general architecture of a communication system is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for group communication, are irrelevant to the actual invention. Therefore, they need not to be discussed in more detail here.

The exemplary radio system of FIG. 1 comprises a network node 101 of a network operator. The network node 101 may include e.g. an LTE (and/or LTE-A) base station (eNB), base transceiver station (BS, BTS), radio network controller (RNC), or any other network element (such as a mobile switching centre (MSC), MSC server (MSS), mobility management entity (MME), gateway GPRS support node (GGSN), serving GPRS support node (SGSN), home location register (HLR), home subscriber server (HSS), visitor location register (VLR)), or a combination of network elements. The network node 101 may be connected to one or more further network elements via an interface (not shown in FIG. 1). In FIG. 1, the radio network node 101 that may also be called eNB (enhanced node-B, evolved node-B) of the radio system hosts the functions for radio resource management in a public land mobile network. FIG. 1 shows one or more user equipment 102 located in the service area of the radio network node 101. The user equipment (UE) refers to a portable computing device, and it may also be referred to as a user terminal. Such computing devices include wireless mobile communication devices operating with or without a subscriber identification module (SIM) in hardware or in software, including, but not limited to, the following types of devices: mobile phone, smart-phone, personal digital assistant (PDA), handset, laptop computer. In the example situation of FIG. 1, the user equipment 102 is capable of connecting to a network node 104 respectively via a connection 105. The network node 104 may include e.g. an access point (AP) of a local area network, or any other network element, or a combination of network elements. The network node 104 may be connected to one or more further network elements via an interface (not shown in FIG. 1). In FIG. 1, the radio network node 104 hosts the functions for local area access in a wireless local area network (WLAN). In an offloading network system according to an exemplary embodiment, AP 104 may be connected to eNB 101 via a transport bridge/router/server functionality (which is integrated with eNB or a separate entity) which is responsible for catching and forwarding/distributing offloaded user-plane packets.

Figure 2:
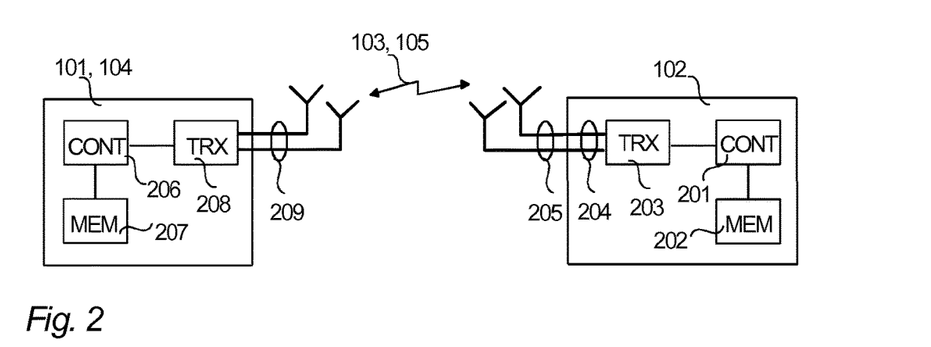
FIG. 2 shows a simplified block diagram illustrating exemplary apparatuses.

FIG. 2 is a block diagram of an apparatus according to an embodiment of the invention. FIG. 2 shows a user equipment 102 located in the area of a radio network node 101, 104. The user equipment 102 is configured to be in connection with the radio network node 101, 104. The user equipment or UE comprises a controller 201 operationally connected to a memory 202 and a transceiver 203. The controller 201 controls the operation of the user equipment 102. The memory 202 is configured to store software and data. The transceiver 203 is configured to set up and maintain a wireless connection 103, 105 to the radio network node 101, 104. The transceiver 203 is operationally connected to a set of antenna ports 204 connected to an antenna arrangement 205. The antenna arrangement 205 may comprise a set of antennas. The number of antennas may be one to four, for example. The number of antennas is not limited to any particular number. The user equipment 102 may also comprise various other components, such as a user interface, camera, and media player. They are not displayed in the figure due to simplicity. The radio network node 101, 104, such as an LTE (LTE-A) base station (eNode-B, eNB) or access point (AP), comprises a controller 206 operationally connected to a memory 207, and a transceiver 208. The controller 206 controls the operation of the radio network node 101, 104. The memory 207 is configured to store software and data. The transceiver 208 is configured to set up and maintain a wireless connection to the user equipment 102 within the service area of the radio network node 101, 104. The transceiver 208 is operationally connected to an antenna arrangement 209. The antenna arrangement 209 may comprise a set of antennas. The number of antennas may be two to four, for example. The number of antennas is not limited to any particular number. The radio network node 101, 104 may be operationally connected (directly or indirectly) to another network element (not shown in FIG. 2) of the communication system, such as a radio network controller (RNC), a mobility management entity (MME), an MSC server (MSS), a mobile switching centre (MSC), a radio resource management (RRM) node, a gateway GPRS support node, an operations, administrations and maintenance (OAM) node, a home location register (HLR), a visitor location register (VLR), a serving GPRS support node, a gateway, and/or a server. The embodiments are not, however, restricted to the network given above as an example, but a person skilled in the art may apply the solution to other communication networks provided with the necessary properties. For example, the connections between different network elements may be realized with internet protocol (IP) connections.

Although the apparatus 101, 102, 104 has been depicted as one entity, different modules and memory may be implemented in one or more physical or logical entities. The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminals include a personal computer, a game console, a laptop (a notebook), a personal digital assistant, a mobile station (mobile phone), a smart phone, and a line telephone.

The apparatus 101, 102, 104 may generally include a processor, controller, control unit or the like connected to a memory and to various interfaces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The memory 202, 207 may include volatile and/or non-volatile memory and typically stores content, data, or the like. For example, the memory 202, 207 may store computer program code such as software applications (for example for the detector unit and/or for the adjuster unit) or operating systems, information, data, content, or the like for a processor to perform steps associated with operation of the apparatus in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Figure 3:
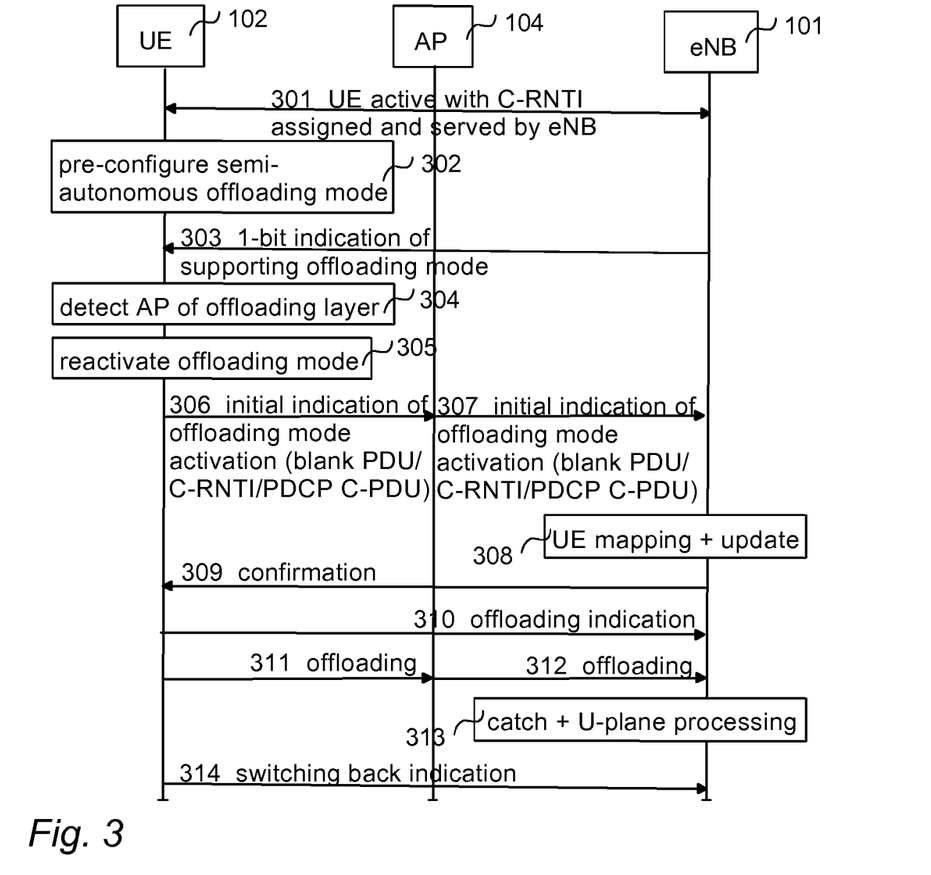
FIG. 3 shows a messaging diagram illustrating an exemplary messaging event according to an embodiment of the invention.

The signalling chart of FIG. 3 illustrates the required signalling, illustrating exemplary semi-autonomous offloading mode activation and offloading operation. In the example of FIG. 3, a network apparatus 102 (such as a user terminal, i.e. user equipment UE) is, in item 301, in an active state and served by a serving base station 101. In item 302, pre-configuration information is for pre-configuring a semi-autonomous offloading mode in UE maintained in the apparatus 102 on at least one integrated local area radio access offloading layer. The preconfigured information may, for example, be received from eNB, it may be stored in UE as default information, or it may be installed in UE during start-up of UE. In item 303, an indication may be transmitted to the apparatus 102 from the base station 101, indicating that the local area radio access offloading mode is supported by the base station eNB, wherein the indication 303 may comprise e.g. a 1-bit (or more) indication sent in a broadcast control channel BCCH or physical downlink control channel PDCCH. In item 304, an access point 104 of an available integrated local area radio access offloading layer may be detected in the apparatus 102. In response to the detecting, a local area radio access offloading mode may be activated, in item 305, in the apparatus 102. In item 306, 307 an initial indication indicating that the local area radio access offloading mode is activated in the user terminal 102 may be transmitted from the user terminal 102 to the base station 101 via the access point 104. For example, a blank PDU, C-RNTI and/or a form of a new PDCP C-PDU (which may not be specific to any U-plane radio bearer at this stage) may be used for the transmission of the initial indication. In item 308, device address mapping of UE may be performed in eNB, and the PDP context of UE may be updated. For example, a UE specific MAC address used for AP offloading access and C-RNTI used for cellular access may be stored and used for mapping and packet forwarding. In item 309, a confirmation indicating that the activated local area radio access offloading mode is accepted by the base station 101 specifically for an individual UE, may be transmitted to the user terminal 102 from the base station 101 via a cellular access C-plane using a RRC message, for instance. This confirmation may include further configuration and/or control information on the serving cell and the network for UE. It is decided in the user terminal 102 whether or not to switch to the available integrated local area radio access offloading layer, wherein if it is decided in the user terminal 102 to switch to the available integrated local area radio access offloading layer, an offloading indication may be transmitted, in item 310, to the base station 101 (directly or via the access point 104). The offloading indication indicating the switching of the user terminal 102 to the available integrated local area radio access offloading layer may be transmitted in a form of a blank U-plane packet with/without C-RNTI attached or a new PDCP C-PDU via the access point 104 to the base station 101, or a blank measurement report to the base station 101 directly (the base station 101 may acknowledge to UE the offloading indication (directly or via the access point) (not shown in FIG. 3)). Item 310 may be omitted in case that the indication of switching to the available integrated local area radio access offloading layer to the base station 101 beforehand is not needed, if the base station 101 is able to catch the packet received from UE via the access point 104 and determine to act accordingly. In item 311, 312, actual offloading operation of a U-plane packet may take place via AP. The network (or eNB) may also catch packets sent by UE, so that eNB may perform 313 required U-plane processing based on either the mapping between a UE specific MAC address used for AP offloading access and C-RNTI used for cellular access, or based on C-RNTI and LCID attached to the received packet. Thus, in the offloading mode, user plane signalling can be carried out between AP and UE by utilizing WiFi, while control plane signalling can be carried out between eNB and UE by utilizing LTE-A. In item 314, an indication of switching back to the base station 101 may be initiated in the user terminal 102 and transmitted to the base station 101 when the configured criteria for offloading to the integrated local area radio access offloading layer cannot be matched. For example, a blank buffer status report or a scheduling request may be used for transmission of the indication. In addition, items 310 and 314 may also be initiated by the network (e.g. by the base station 101) using similar signalling as in the user terminal 102 initiated approach. For example, a blank measurement request or a blank handover command may be used in the base station 101 to indicate to the user terminal 102 to switch to the available integrated local area radio access offloading layer and resource allocation with at least a preconfigured "delta" increase compared to the previous one or a blank handover command to indicate to the user terminal 102 to switch back to the base station 101 directly. Thus item 314 may comprise an indication of switching back to regular cellular transmission (i.e. transmit directly to eNB without offloading).

Figure 4:
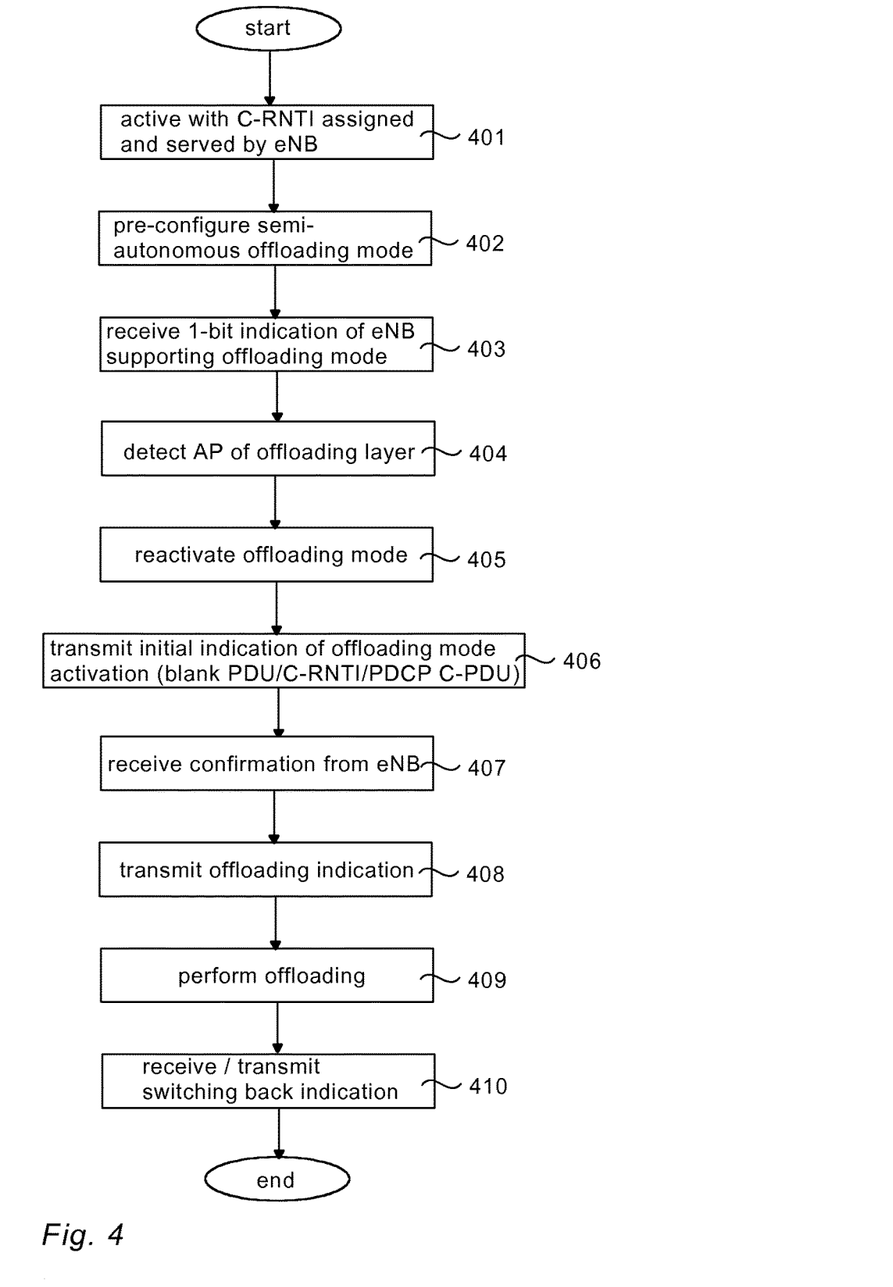
FIG. 4 shows a schematic diagram of a flow chart according to an exemplary embodiment of the invention.

FIG. 4 is a flow chart illustrating an exemplary embodiment. The apparatus 102 (such as a user terminal, i.e. user equipment UE) is, in item 401, in an active state and served by a serving base station 101. In item 402, pre-configuration information for pre-configuring a semi-autonomous offloading mode in UE is maintained in the apparatus 102 on at least one integrated local area radio access offloading layer. The preconfigured information may, for example, be received from eNB, it may be stored in UE as default information, or it may be installed in UE during start-up of UE. In item 403, an indication may be received in the apparatus 102 from the base station 101, indicating that the local area radio access offloading mode is supported by the base station eNB, wherein the indication may comprise e.g. a 1-bit (or more) indication sent in a broadcast control channel BCCH or physical downlink control channel PDCCH. In item 404, an access point 104 of an available integrated local area radio access offloading layer may be detected/discovered in the apparatus 102. In response to the detecting, a local area radio access offloading mode may be activated, in item 405, in the apparatus 102. In item 406, an initial indication indicating that the local area radio access offloading mode is activated in the user terminal 102 may be transmitted from the user terminal 102 to the base station 101 via the access point 104. For example, a blank PDU, C-RNTI and/or a form of a new PDCP C-PDU (which may not be specific to any U-plane radio bearer at this stage) may be used for the transmission of the initial indication. In item 407, a confirmation indicating that the activated local area radio access offloading mode is accepted by the base station 101 may optionally be received in the user terminal 102 from the base station 101. It is decided in the user terminal 102 whether or not to switch to the available integrated local area radio access offloading layer, wherein if it is decided in the user terminal 102 to switch to the available integrated local area radio access offloading layer, an offloading indication may be transmitted, in item 408, to the base station 101 (directly or via the access point 104). The offloading indication indicating the switching of the user terminal 102 to the available integrated local area radio access offloading layer may be transmitted in a form of a blank U-plane packet with/without C-RNTI attached or a new PDCP C-PDU via the access point 104 to the base station 101, or a blank measurement report to the base station 101 directly (an acknowledgement may be received from the base station 101 regarding the offloading indication (directly or via the access point) (not shown in FIG. 4)). Item 408 may be omitted in case that the indication of switching to the available integrated local area radio access offloading layer to the base station 101 beforehand is not needed, if the base station 101 is able catch the packet received from UE via the access point 104 and determine to act accordingly. In item 409, actual offloading operation of a U-plane packet may take place via AP. The network (or eNB) may also catch packets sent by UE, so that eNB may perform required U-plane processing based on either the mapping between a UE specific MAC address used for AP offloading access and C-RNTI used for cellular access, or based on C-RNTI and LCID attached to the received packet. Thus, in the offloading mode, user plane signalling can be carried out between AP and UE by utilizing WiFi, while control plane signalling can be carried out between eNB and UE by utilizing LTE-A. In item 410, an indication of switching back to the base station 101 may be initiated in the user terminal 102 and transmitted to the base station 101 when the configured criteria for offloading to the integrated local area radio access offloading layer cannot be matched. For example, a blank buffer status report or scheduling request may be used for transmission of the indication. In addition, items 408 and 410 may also be initiated by the network (e.g. the base station 101) using similar signalling as the user terminal 102 initiated approach. For example, a blank measurement request or a blank handover command may be received 410 from the base station 101, indicating to the user terminal 102 to switch to the available integrated local area radio access offloading layer and resource allocation with at least a preconfigured "delta" increase compared to the previous one or a blank handover command to indicate to the user terminal 102 to switch back to the base station 101 directly. Thus item 410 may comprise an indication of switching back to regular cellular transmission (i.e. transmit directly to eNB without offloading).

Figure 5:
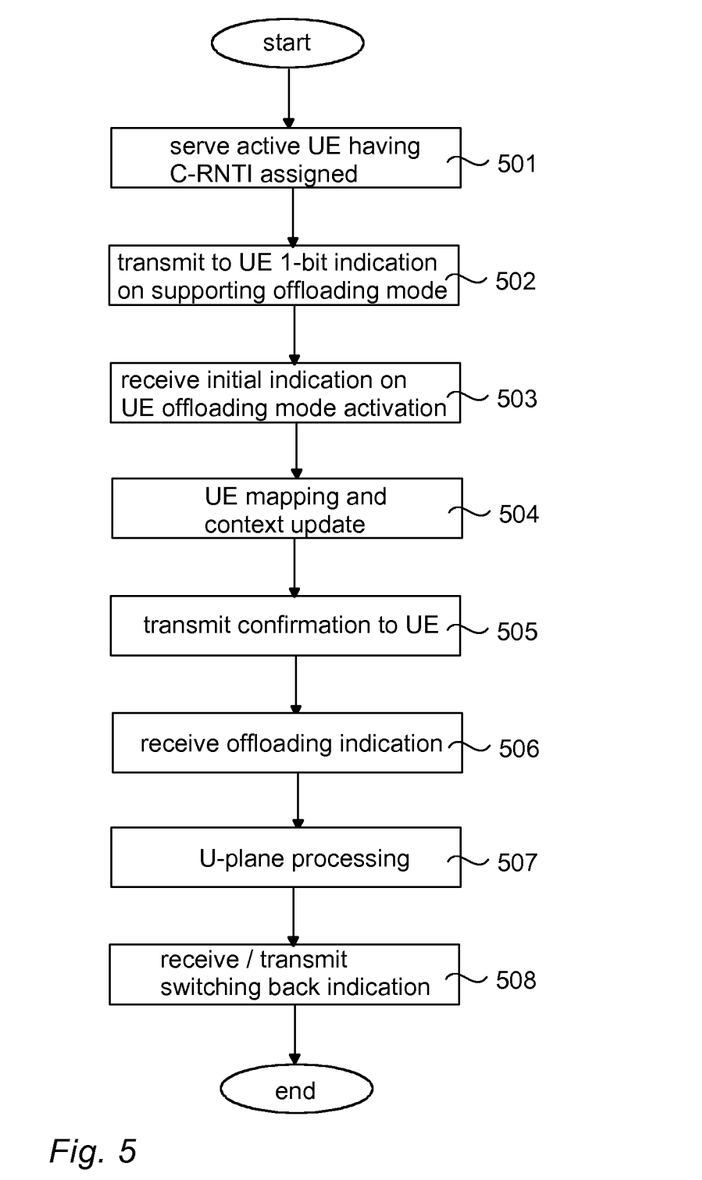
FIG. 5 shows a schematic diagram of a flow chart according to an exemplary embodiment of the invention.

FIG. 5 is a flow chart illustrating an exemplary embodiment. The apparatus 101 (such as a base station, i.e. enhanced node-B eNB) is, in item 501, serving a user terminal 101 which is in an active state with C-RNTI assigned. In item 502, an indication may be transmitted to the user terminal 102 from the base station 101, indicating that the local area radio access offloading mode is supported by the base station eNB, wherein the indication may comprise e.g. a 1-bit (or more) indication sent in a broadcast control channel BCCH or physical downlink control channel PDCCH. In item 503, an initial indication indicating that a local area radio access offloading mode is activated in the user terminal 102 may be received in the apparatus 101 from the user terminal 102 via an access point 104 detected in the user terminal 102. For example, a blank PDU, C-RNTI and/or a form of a new PDCP C-PDU (which may not be specific to any U-plane radio bearer at this stage) may be used for the transmission of the initial indication. In item 504, device address mapping of UE may be performed in eNB, and the PDP context of UE may be updated. In item 505, a confirmation indicating that the activated local area radio access offloading mode is accepted by the base station 101 may optionally be transmitted to the user terminal 102 from the base station 101. If it is decided in the user terminal 102 to switch to the available integrated local area radio access offloading layer, an offloading indication may be received, in item 506, from the user terminal 102 (e.g. via the access point 104). The offloading indication indicating the switching of the user terminal 102 to the available integrated local area radio access offloading layer may be received in a form of a blank U-plane packet with/without C-RNTI attached or a new PDCP C-PDU from the user terminal 102 via the access point 104, or a blank measurement report from the user terminal 102 directly. An acknowledgement may be transmitted from the base station 101 to UE regarding the offloading indication (directly or via the access point) (not shown in FIG. 5). The base station (or the network) may catch packets sent by UE. Item 506 may be omitted in case that the indication of switching to the available integrated local area radio access offloading layer to the base station 101 beforehand is not needed, if the base station 101 is able catch the packet received from UE via the access point 104 and determine to act accordingly. In item 507, required U-plane processing for offloading are performed in eNB based on either the mapping between a UE specific MAC address used for AP offloading access and C-RNTI used for cellular access or based on C-RNTI and LCID attached to the received packet. Thus, in the offloading mode, user plane signalling can be carried out between AP and UE by utilizing WiFi, while control plane signalling can be carried out between eNB and UE by utilizing LTE-A. In item 508, an indication of switching back to the base station 101 may be initiated in the user terminal 102 and received in the base station 101 when the configured criteria for offloading to the integrated local area radio access offloading layer cannot be matched. For example, a blank buffer status report or scheduling request may be used for transmission of the indication. In addition, the items 506 and 508 may also be initiated by the network (e.g. the base station 101) using similar signalling as the user terminal 102 initiated approach. For example, a blank measurement request or a blank handover command may be used by the base station 101 to indicate to the user terminal 102 to switch to the available integrated local area radio access offloading layer and resource allocation with at least a preconfigured "delta" increase compared to the previous one or a blank handover command to indicate to the user terminal 102 to switch back to the base station 101 directly. Thus item 508 may comprise an indication of switching back to regular cellular transmission (i.e. transmit directly to eNB without offloading).

The steps/points, signalling messages and related functions described above in FIGS. 1 to 5 are in no absolute chronological order, and some of the steps/points may be performed simultaneously or in an order differing from the given one. Other functions can also be executed between the steps/points or within the steps/points and other signalling messages sent between the illustrated messages. Some of the steps/points or part of the steps/points can also be left out or replaced by a corresponding step/point or part of the step/point. The apparatus operations illustrate a procedure that may be implemented in one or more physical or logical entities. The signalling messages are only exemplary and may even comprise several separate messages for transmitting the same information. In addition, the messages may also contain other information.

Thus, according to an exemplary embodiment, there is provided a method for radio access offloading in a communications system, the system comprising a terminal apparatus served by a base station, the method comprising maintaining, in the terminal apparatus, pre-configuration information on at least one integrated local area radio access offloading layer; detecting, in the terminal apparatus, an access point of an available integrated local area radio access offloading layer; in response to the detecting, activating, in the terminal apparatus, a local area radio access offloading mode; transmitting, from the terminal apparatus to the base station, an initial indication indicating that the local area radio access offloading mode is activated in the terminal apparatus; receiving, in the terminal apparatus from the base station, a confirmation indicating that the activated local area radio access offloading mode is accepted by the base station; deciding, in the terminal apparatus, whether or not to switch to the available integrated local area radio access offloading layer, wherein if it is decided, in the terminal apparatus, to switch to the available integrated local area radio access offloading layer, the method comprises performing offloading operation of a user plane packet via the access point.

According to another exemplary embodiment, the integrated local area radio access offloading layer comprises an integrated radio access layer of a serving macro cell for a user plane, wherein local access points are deployed underneath macro cell coverage and controlled by a serving macro base station and a cellular network, a control plane being provided by the serving macro base station.

According to yet another exemplary embodiment, data transmission of a user plane radio bearer is transferred via a WiFi network.

According to yet another exemplary embodiment, there is provided a method for only offloading best effort traffic and a radio bearer thereof.

According to yet another exemplary embodiment, there is provided a method for offloading any user plane traffic and a radio bearer thereof, wherein transmission of an individual radio bearer is switched in time between a cellular network and a WiFi network for offloading.

According to yet another exemplary embodiment, information about possible integrated local area radio access offloading layers is pre-configured in the terminal apparatus, such that the terminal apparatus is, upon discovering an access point having corresponding attributes matching the pre-configured information, able to activate a corresponding offloading operation mode.

According to yet another exemplary embodiment, information about possible integrated local area radio access offloading layers is received in the terminal apparatus from the base station and/or from an access network discovery and selection function ANDSF.

According to yet another exemplary embodiment, an indication is received, in the terminal apparatus from the base station, indicating that the local area radio access offloading mode is supported by the base station, the indication comprising a one or more bit indication sent in a broadcast control channel BCCH or physical downlink control channel PDCCH.

According to yet another exemplary embodiment, criteria used in the terminal apparatus to decide whether to switch to a WiFi layer or not, include one or more of performance parameters and quality of service QoS parameters.

According to yet another exemplary embodiment, for ensuring in-order delivery and loss recovery, PDCP level content synchronization or acknowledgement procedures are introduced for the offloading operation mode, the procedures being periodical or triggered with certain timer based or packet sequence number based window operation, by using PDCP C-PDU or RRC signalling or a combination thereof.

According to yet another exemplary embodiment, if it is decided, in the terminal apparatus, to switch to the available integrated local area radio access offloading layer, the method comprises transmitting an offloading indication to the base station, the offloading indication indicating the switching of the terminal apparatus to the available integrated local area radio access offloading layer.

According to yet another exemplary embodiment, there is provided a method for transmitting the offloading indication to the base station via the access point.

According to yet another exemplary embodiment, the offloading indication is transmitted by using a blank user plane data packet with or without a cell radio network temporary identifier C-RNTI as payload traffic, a new PDCP C-PDU, or a blank measurement report.

According to yet another exemplary embodiment, the offloading indication is transmitted by using implicit or embedded LTE control signalling.

According to yet another exemplary embodiment, there is provided a method for transmitting the initial indication from the terminal apparatus to the base station via the access point.

According to yet another exemplary embodiment, there is provided a method for initiating, in the terminal apparatus, switching back to the base station when configured criteria for offloading to the integrated local area radio access offloading layer is not matched, wherein a switching back indication is transmitted from the terminal apparatus to the base station.

According to yet another exemplary embodiment, the switching back indication is transmitted from the terminal apparatus to the base station by using a blank buffer status report or a scheduling request.

According to yet another exemplary embodiment, there is provided an apparatus comprising at least one processor, and at least one memory including a computer program code, wherein the at least one memory and the computer program code are configured to, with the at least one processor, cause the apparatus to maintain pre-configuration information on at least one integrated local area radio access offloading layer; detect an access point of an available integrated local area radio access offloading layer; in response to the detecting, activate a local area radio access offloading mode; transmit, to a serving base station via the access point, an initial indication indicating that the local area radio access offloading mode is activated in the apparatus; receive, from the base station, a confirmation indicating that the activated local area radio access offloading mode is accepted by the base station; decide whether or not to switch to the available integrated local area radio access offloading layer, wherein if it is decided, in the apparatus, to switch to the available integrated local area radio access offloading layer, the at least one memory and the computer program code are configured to, with the at least one processor, cause the apparatus to perform offloading operation of a user plane packet via the access point.

According to yet another exemplary embodiment, the at least one memory and the computer program code are configured to, with the at least one processor, cause the apparatus to transfer data transmission of a user plane radio bearer via a WiFi network.

According to yet another exemplary embodiment, the at least one memory and the computer program code are configured to, with the at least one processor, cause the apparatus to only offload best effort traffic and a radio bearer thereof.

According to yet another exemplary embodiment, the at least one memory and the computer program code are configured to, with the at least one processor, cause the apparatus to offload any user plane traffic and a radio bearer thereof, wherein transmission of an individual radio bearer is switched in time between a cellular network and a WiFi network for offloading.

According to yet another exemplary embodiment, the at least one memory and the computer program code are configured to, with the at least one processor, cause the apparatus to pre-configure information about possible integrated local area radio access offloading layers, such that the apparatus is, upon discovering an access point having corresponding attributes matching the pre-configured information, able to activate a corresponding offloading operation mode.

According to yet another exemplary embodiment, the at least one memory and the computer program code are configured to, with the at least one processor, cause the apparatus to receive information about possible integrated local area radio access offloading layers from the base station and/or from an access network discovery and selection function ANDSF.

According to yet another exemplary embodiment, the at least one memory and the computer program code are configured to, with the at least one processor, cause the apparatus to receive an indication from the base station, indicating that the local area radio access offloading mode is supported by the base station, the indication comprising a one or more bit indication sent in a broadcast control channel BCCH or physical downlink control channel PDCCH.

According to yet another exemplary embodiment, the at least one memory and the computer program code are configured to, with the at least one processor, cause the apparatus to use criteria to decide whether to switch to a WiFi layer or not, the criteria including one or more of performance parameters and quality of service QoS parameters.

According to yet another exemplary embodiment, the at least one memory and the computer program code are configured to, with the at least one processor, cause the apparatus to, for ensuring in-order delivery and loss recovery, introduce PDCP level content synchronization or acknowledgement procedures for the offloading operation mode, the procedures being periodical or triggered with certain timer based or packet sequence number based window operation, by using PDCP C-PDU or RRC signalling or a combination thereof.

According to yet another exemplary embodiment, the at least one memory and the computer program code are configured to, with the at least one processor, cause the apparatus to transmit, if it is decided, in the apparatus, to switch to the available integrated local area radio access offloading layer, an offloading indication to the base station, the offloading indication indicating the switching of the apparatus to the available integrated local area radio access offloading layer.

According to yet another exemplary embodiment, the at least one memory and the computer program code are configured to, with the at least one processor, cause the apparatus to transmit the offloading indication to the base station via the access point.

According to yet another exemplary embodiment, the at least one memory and the computer program code are configured to, with the at least one processor, cause the apparatus to transmit the offloading indication by using a blank user plane data packet with or without a cell radio network temporary identifier C-RNTI as payload traffic, a new PDCP C-PDU, or a blank measurement report.

According to yet another exemplary embodiment, the at least one memory and the computer program code are configured to, with the at least one processor, cause the apparatus to transmit the offloading indication by using implicit or embedded LTE control signalling.

According to yet another exemplary embodiment, the at least one memory and the computer program code are configured to, with the at least one processor, cause the apparatus to transmit the initial indication from the apparatus to the base station via the access point.

According to yet another exemplary embodiment, the at least one memory and the computer program code are configured to, with the at least one processor, cause the apparatus to initiate switching back to the base station when configured criteria for offloading to the integrated local area radio access offloading layer is not matched, wherein a switching back indication is transmitted from the apparatus to the base station.

According to yet another exemplary embodiment, the at least one memory and the computer program code are configured to, with the at least one processor, cause the apparatus to transmit the switching back indication by using a blank measurement request or a blank handover command.

According to yet another exemplary embodiment, the apparatus comprises a user terminal.

According to yet another exemplary embodiment, there is provided a base station comprising at least one processor, and at least one memory including a computer program code, wherein the at least one memory and the computer program code are configured to, with the at least one processor, cause the base station to receive, from a terminal apparatus via an access point of an available integrated local area radio access offloading layer, an initial indication indicating that a local area radio access offloading mode is activated in the terminal apparatus; transmit, to the terminal apparatus, a confirmation indicating that the activated local area radio access offloading mode is accepted by the base station.

According to yet another exemplary embodiment, the at least one memory and the computer program code are configured to, with the at least one processor, cause the base station to transmit information about possible integrated local area radio access offloading layers to the terminal apparatus.

According to yet another exemplary embodiment, the at least one memory and the computer program code are configured to, with the at least one processor, cause the base station to transmit an indication to the terminal apparatus, indicating that the local area radio access offloading mode is supported by the base station, the indication comprising a one or more bit indication sent in a broadcast control channel BCCH or physical downlink control channel PDCCH.

According to yet another exemplary embodiment, the at least one memory and the computer program code are configured to, with the at least one processor, cause the base station to receive an offloading indication, the offloading indication indicating the switching of the terminal apparatus to the available integrated local area radio access offloading layer.

According to yet another exemplary embodiment, the at least one memory and the computer program code are configured to, with the at least one processor, cause the base station to receive the offloading indication by using a blank data packet or cell radio network temporary identifier C-RNTI as payload traffic.

According to yet another exemplary embodiment, the at least one memory and the computer program code are configured to, with the at least one processor, cause the base station to receive the offloading indication by using implicit or embedded LTE control signalling.

According to yet another exemplary embodiment, the at least one memory and the computer program code are configured to, with the at least one processor, cause the base station to receive the offloading indication via the access point.

According to yet another exemplary embodiment, the at least one memory and the computer program code are configured to, with the at least one processor, cause the base station to introduce, for ensuring in-order delivery and loss recovery, PDCP level content synchronization or acknowledgement procedures for the offloading operation mode, the procedures being periodical or triggered with certain timer based or packet sequence number based window operation, by using PDCP C-PDU or RRC signalling or a combination thereof.

According to yet another exemplary embodiment, the at least one memory and the computer program code are configured to, with the at least one processor, cause the base station to perform user plane processing based on mapping between a terminal-apparatus-specific MAC address used for AP offloading access and C-RNTI used for cellular access, or based on C-RNTI and LCID attached to a received packet.

According to yet another exemplary embodiment, the at least one memory and the computer program code are configured to, with the at least one processor, cause the base station to initiate switching back to the base station when configured criteria for offloading to the integrated local area radio access offloading layer is not matched, wherein a switching back indication is transmitted to the terminal apparatus.

According to yet another exemplary embodiment, the at least one memory and the computer program code are configured to, with the at least one processor, cause the base station to transmit the switching back indication by using a blank measurement request or a blank handover command.

According to yet another exemplary embodiment, there is provided a computer program comprising program code means adapted to perform any of the method steps when the program is run on a computer.

According to yet another exemplary embodiment, there is provided a computer-readable medium having stored thereon a data structure, comprising a computer readable medium and embodying program instructions thereon executable by a computer operably coupled to a memory which, when executed by the computer, carry out the functions according to the method.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

LTE long term evolution
LTE-A long term evolution advanced
eNB enhanced node-B
BCCH broadcast control channel
PDCCH physical downlink control channel
PDU packet/payload data unit
UE user equipment
PDP packet data protocol
C-RNTI cell radio network temporary identifier
WiFi wireless fidelity
HetNet heterogeneous network
CAPEX capital expenditure
OPEX operational expenditure
WLAN wireless local area network LA local area
eLA enhanced local area
eCA enhanced carrier aggregation
CA carrier aggregation
RAT radio access technology
L1 layer-1
L2 layer-2
3GPP 3rd generation partnership project
UL uplink
DL downlink
TDD time division duplex
RRH remote radio head
QoS quality of service
ANDSF access network discovery and selection function
U-plane user plane
C-plane control plane
RB radio bearer
E-UTRAN enhanced UMTS terrestrial radio access network
UMTS universal mobile telecommunications system
PDCP packet data convergence protocol
C-PDU control packet/payload data unit
AP access point
EPC evolved packet core
LCID logical channel identification??

The invention claimed is:

1. A method for radio access offloading in a communications system, the method comprising: maintaining, in a terminal apparatus served by a serving base station, pre-configuration information on at least one integrated local area radio access offloading layer; detecting, in the terminal apparatus, an access point of an available integrated local area radio access offloading layer; in response to the detecting, activating, in the terminal apparatus, a local area radio access offloading mode; transmitting, from the terminal apparatus to the serving base station, an initial indication indicating that the local area radio access offloading mode is activated in the terminal apparatus; receiving, in the terminal apparatus from the serving base station, a confirmation indicating that the activated local area radio access offloading mode is accepted by the serving base station;
deciding, in the terminal apparatus, whether or not to switch to the available integrated local area radio access offloading layer, wherein if it is decided, in the terminal apparatus, to switch to the available integrated local area radio access offloading layer, the method comprises performing offloading operation of a user plane packet via the access point, wherein the integrated local area radio access offloading layer comprises an integrated radio access layer of a serving macro cell for a user plane, wherein local access points are deployed underneath macro cell coverage and controlled by the serving base station and a cellular network, a control plane being provided by the serving macro base station, and switching back to the serving base station based on a switching back indication, wherein at least one of the switching back indication is transmitted from the terminal apparatus to the serving base station when configured criteria for offloading to the integrated local area radio access offloading layer is not matched; and the switching back indication is received from the serving base station to initiate the switching back to the serving base station.

2. A method according to claim 1, wherein data transmission of a user plane radio bearer is transferred via a WiFi network.

3. A method according to claim 1, comprising only offloading best effort traffic and a radio bearer thereof.

4. A method according to claim 1, comprising:
offloading any user plane traffic and a radio bearer thereof, wherein transmission of an individual radio bearer is switched in time between a cellular network and a WiFi network for offloading.

5. A method according to claim 1, wherein information about possible integrated local area radio access offloading layers is pre-configured in the terminal apparatus, such that the terminal apparatus is, upon discovering an access point having corresponding attributes matching the pre-configured information, able to activate a corresponding off-loading operation mode.

6. A method according to claim 1, wherein information about possible integrated local area radio access offloading layers is received in the terminal apparatus from the serving base station and/or from an access network discovery and selection function ANDSF.

7. A method according to claim 1, wherein an indication is received, in the terminal apparatus from the serving base station, indicating that the local area radio access offloading mode is supported by the serving base station, the indication comprising a one or more bit indication sent in at least one of: a broadcast control channel BCCH, and a physical downlink control channel PDCCH.

8. A method according to claim 1, wherein criteria used in the terminal apparatus to decide whether to switch to a WiFi layer or not, include one or more of performance parameters and quality of service QoS parameters.

9. A method according to claim 1, wherein, for ensuring in-order delivery and loss recovery, PDCP level content synchronization or acknowledgement procedures are introduced for the offloading operation mode, the procedures being periodical or triggered with certain timer based or packet sequence number based window operation, by using PDCP C-PDU or RRC signalling or a combination thereof.

10. A method according to claim 1, wherein, if it is decided, in the terminal apparatus, to switch to the available integrated local area radio access offloading layer, the method comprises transmitting an offloading indication to the serving base station, the offloading indication indicating the switching of the terminal apparatus to the available integrated local area radio access offloading layer.

11. A method according to claim 10, comprising:
transmitting the offloading indication to the serving base station via the access point.

12. A method according to claim 10, wherein the offloading indication is transmitted by using at least one of:
a blank user plane data packet with or without a cell radio network temporary identifier C-RNTI as payload traffic,
a new PDCP C-PDU, and
a blank measurement report.

13. A method according to claim 10, wherein the offloading indication is transmitted by using implicit or embedded LTE control signalling.

14. A method according to claim 1, comprising:
transmitting the initial indication from the terminal apparatus to the serving base station via the access point.

15. A method according to claim 1, wherein the switching back indication is transmitted from the terminal apparatus to the serving base station by using a blank buffer status report or a scheduling request.

16. A non-transitory computer-readable medium comprising program instructions stored thereon, the program instructions executable by a computer to cause the computer to perform the method according to claim 1.

17. The method of claim 1, wherein performing offloading operation comprises: transmitting the user plane packet via one of the local access points to the serving base station.

18. An apparatus comprising at least one processor; and at least one memory including a computer program code, characterized in that the at least one memory and the computer program code are configured to, with the at least one processor, cause the apparatus to: maintain pre-configuration information on at least one integrated local area radio access offloading layer;
  detect an access point of an available integrated local area radio access offloading layer; in response to the detecting, activate a local area radio access offloading mode; transmit, to a serving base station via the access point, an initial indication indicating that the local area radio access offloading mode is activated in the apparatus; receive, from the serving base station, a confirmation indicating that the activated local area radio access offloading mode is accepted by the serving base station;
  decide whether or not to switch to the available integrated local area radio access offloading layer, wherein if it is decided, in the apparatus, to switch to the available integrated local area radio access offloading layer, the at least one memory and the computer program code are configured to, with the at least one processor, cause the apparatus to perform offloading operation of a user plane packet via the access point, wherein the integrated local area radio access offloading layer comprises an integrated radio access layer of a serving macro cell for a user plane, wherein local access points are deployed underneath macro cell coverage and controlled by a serving macro-the serving base station and a cellular network, a control plane being provided by the serving macro base station; and switch back to the serving base station based on a switching back indication, wherein at least one of the switching back indication is transmitted from the terminal apparatus to the serving base station when configured criteria for offloading to the integrated local area radio access offloading layer is not matched; and the switching back indication is received from the serving base station to initiate the switching back to the serving base station.

19. An apparatus according to claim 18, wherein the at least one memory and the computer program code are configured to, with the at least one processor, cause the apparatus to transfer data transmission of a user plane radio bearer via a WiFi network.

20. An apparatus according to claim 18, wherein the at least one memory and the computer program code are configured to, with the at least one processor, cause the apparatus to only offload best effort traffic and a radio bearer thereof.

21. An apparatus according to claim 18, wherein the at least one memory and the computer program code are configured to, with the at least one processor, cause the apparatus to offload any user plane traffic and a radio bearer thereof, wherein transmission of an individual radio bearer is switched in time between a cellular network and a WiFi network for offloading.

22. An apparatus according to claim 18, wherein the at least one memory and the computer program code are configured to, with the at least one processor, cause the apparatus to pre-configure information about possible integrated local area radio access offloading layers, such that the apparatus is, upon discovering an access point having corresponding attributes matching the pre-configured information, able to activate a corresponding offloading operation mode.

23. An apparatus according to claim 18, wherein the at least one memory and the computer program code are configured to, with the at least one processor, cause the apparatus to receive information about possible integrated local area radio access offloading layers from the serving base station and/or from an access network discovery and selection function ANDSF.

24. An apparatus according to claim 18, wherein the at least one memory and the computer program code are configured to, with the at least one processor, cause the apparatus to receive an indication from the serving base station, indicating that the local area radio access offloading mode is supported by the serving base station, the indication comprising a one or more bit indication sent in a broadcast control channel BCCH or physical downlink control channel PDCCH.

25. An apparatus according to claim 18, wherein the at least one memory and the computer program code are configured to, with the at least one processor, cause the apparatus to use criteria to decide whether to switch to a WiFi layer or not, the criteria including one or more of performance parameters and quality of service QoS parameters.

26. An apparatus according to claim 18, wherein the at least one memory and the computer program code are configured to, with the at least one processor, cause the apparatus to, for ensuring in-order delivery and loss recovery, introduce PDCP level content synchronization or acknowledgement procedures for the offloading operation mode, the procedures being periodical or triggered with certain timer based or packet sequence number based window operation, by using PDCP C-PDU or RRC signalling or a combination thereof.

27. An apparatus according to claim 18, wherein the at least one memory and the computer program code are configured to, with the at least one processor, cause the apparatus to:
  transmit, if it is decided, in the apparatus, to switch to the available integrated local area radio access offloading layer, an offloading indication to the serving base station, the offloading indication indicating the switching of the apparatus to the available integrated local area radio access offloading layer.

28. An apparatus according to claim 18, wherein the at least one memory and the computer program code are configured to, with the at least one processor, cause the apparatus to transmit the offloading indication to the serving base station via the access point.

29. An apparatus according to claim 18, wherein the at least one memory and the computer program code are configured to, with the at least one processor, cause the apparatus to transmit the offloading indication by using
  a blank user plane data packet with or without a cell radio network temporary identifier C-RNTI as payload traffic,
  a new PDCP C-PDU, or
  a blank measurement report.

30. An apparatus according to claim 18, wherein the at least one memory and the computer program code are configured to, with the at least one processor, cause the apparatus to transmit the offloading indication by using implicit or embedded LTE control signalling.

31. An apparatus according to claim 18, wherein the at least one memory and the computer program code are configured to, with the at least one processor, cause the apparatus to transmit the initial indication from the apparatus to the serving base station via the access point.

32. An apparatus according to claim 18, wherein the at least one memory and the computer program code are configured to, with the at least one processor, cause the apparatus to transmit the switching back indication by using a blank measurement request or a blank handover command.

33. An apparatus according to claim 18, wherein the apparatus comprises a user terminal.

34. The apparatus according to claim 18, wherein performance of the offloading operation comprises transmission of the user plane packet via one of the local access points to the serving base station.

35. A base station comprising:
   at least one processor; and
   at least one memory including a computer program code, characterized in that the at least one memory and the computer program code are configured to, with the at least one processor, cause the base station to:
   receive, from a terminal apparatus via an access point of an available integrated local area radio access offloading layer, an initial indication indicating that a local area radio access offloading mode is activated in the terminal apparatus;
   transmit, to the terminal apparatus, a confirmation indicating that the activated local area radio access offloading mode is accepted by the base station for allowing the terminal apparatus to decide whether or not to switch to the available integrated local area radio access offloading layer, wherein the integrated local area radio access offloading layer comprises an integrated radio access layer of a serving macro cell for a user plane, wherein local access points are deployed underneath macro cell coverage and controlled by the base station and a cellular network, a control plane being provided by the base station; and
   either initiate, in the base station, switching back of the terminal apparatus to the base station, wherein a switching back indication is transmitted from the base station to the terminal apparatus; or
   receive a switching back indication from the terminal apparatus indicating that the terminal apparatus has initiated switching back to the base station.

36. A base station according to claim 35, wherein the at least one memory and the computer program code are configured to, with the at least one processor, cause the base station to transmit information about possible integrated local area radio access offloading layers to the terminal apparatus.

37. A base station according to claim 35, wherein the at least one memory and the computer program code are configured to, with the at least one processor, cause the base station to transmit an indication to the terminal apparatus, indicating that the local area radio access offloading mode is supported by the base station, the indication comprising a one or more bit indication sent in a broadcast control channel BCCH or physical downlink control channel PDCCH.

38. A base station according to claim 37, wherein the at least one memory and the computer program code are configured to, with the at least one processor, cause the base station to receive the offloading indication by using implicit or embedded LTE control signalling.

39. A base station according to claim 35, wherein the at least one memory and the computer program code are configured to, with the at least one processor, cause the base station to receive an offloading indication, the offloading indication indicating the switching of the terminal apparatus to the available integrated local area radio access offloading layer.

40. A base station according to claim 39, wherein the at least one memory and the computer program code are configured to, with the at least one processor, cause the base station to receive the offloading indication by using a blank data packet or cell radio network temporary identifier C-RNTI as payload traffic.

41. A base station according to claim 39, wherein the at least one memory and the computer program code are configured to, with the at least one processor, cause the base station to receive the offloading indication via the access point.

42. A base station according to claim 35, wherein the at least one memory and the computer program code are configured to, with the at least one processor, cause the base station to introduce, for ensuring in-order delivery and loss recovery, PDCP level content synchronization or acknowledgement procedures for the offloading operation mode, the procedures being periodical or triggered with certain timer based or packet sequence number based window operation, by using PDCP C-PDU or RRC signalling or a combination thereof.

43. A base station according to claim 42, wherein the at least one memory and the computer program code are configured to, with the at least one processor, cause the base station to perform user plane processing based on mapping between a terminal-apparatus-specific MAC address used for AP offloading access and C-RNTI used for cellular access, or based on C-RNTI and LCID attached to a received packet.

44. A base station according to claim 35, wherein the switching back is initiated when configured criteria for offloading to the integrated local area radio access offloading layer is not matched.

45. A base station according to claim 44, wherein the at least one memory and the computer program code are configured to, with the at least one processor, cause the base station to transmit the switching back indication by using a blank measurement request or a blank handover command.

46. The base station of claim 35, wherein the at least one memory and the computer program code are configured to, with the at least one processor, cause the base station to: receive, from the terminal apparatus performing the offloading operation, a user plane packet via one of the local access points.

* * * * *

UNITED STATES PATENT AND TRADEMARK OFFICE
CERTIFICATE OF CORRECTION

PATENT NO. : 9,973,992 B2  
APPLICATION NO. : 14/407130  
DATED : May 15, 2018  
INVENTOR(S) : Vinh Van Phan et al.

Page 1 of 1

It is certified that error appears in the above-identified patent and that said Letters Patent is hereby corrected as shown below:

In the Claims

In Claim 1:
Column 19, Line 56, "macro" should be deleted.

In Claim 18:
Column 21, Line 34, "a serving macro" should be deleted.

In Claim 18:
Column 21, Line 36, "macro" should be deleted.

In Claim 18:
Column 21, Line 39, "terminal" should be deleted.

Signed and Sealed this  
Third Day of July, 2018

Andrei Iancu  
*Director of the United States Patent and Trademark Office*